(12) United States Patent
Lie

(10) Patent No.: US 7,789,405 B2
(45) Date of Patent: Sep. 7, 2010

(54) LINKAGE-TYPE AIR SUSPENSION SYSTEM

(75) Inventor: Tjong T. Lie, Naperville, IL (US)

(73) Assignee: Link Manufacturing, Ltd., Sioux Center, IA (US)

( * ) Notice: Subject to any disclaimer, the term of this patent is extended or adjusted under 35 U.S.C. 154(b) by 169 days.

(21) Appl. No.: 12/218,289

(22) Filed: Jul. 14, 2008

(65) Prior Publication Data

US 2010/0007110 A1  Jan. 14, 2010

(51) Int. Cl.
 *B60G 9/02* (2006.01)
 *B60G 3/12* (2006.01)
 *B60G 11/42* (2006.01)
(52) U.S. Cl. .............................. 280/124.116; 267/293
(58) Field of Classification Search ... 267/141.2–141.5, 267/141.7, 292–294; 280/124.106, 124.107, 280/124.116, 124.128, 124.13, 124.157; 384/220, 202
 See application file for complete search history.

(56) References Cited

U.S. PATENT DOCUMENTS

| | | | | |
|---|---|---|---|---|
| 3,025,076 A * | 3/1962 | Davies et al. | ................ | 280/104 |
| 3,630,541 A * | 12/1971 | Carlson et al. | ......... | 280/124.116 |
| 4,415,179 A * | 11/1983 | Marinelli | ............. | 280/124.116 |
| 4,756,550 A * | 7/1988 | Raidel | ...................... | 280/86.75 |
| 4,809,960 A * | 3/1989 | Kakimoto et al. | ........... | 267/141 |
| 5,029,885 A * | 7/1991 | Steiner | ................. | 280/124.116 |
| 5,058,867 A * | 10/1991 | Hadano et al. | ............ | 267/141.3 |
| 5,230,528 A * | 7/1993 | Van Raden et al. | .......... | 280/86.5 |
| 5,328,160 A * | 7/1994 | McLaughlin | ............. | 267/141.3 |
| 5,362,093 A | 11/1994 | Klosterhuber et al. | | |
| 5,692,767 A | 12/1997 | Kato | | |
| 5,785,345 A * | 7/1998 | Barlas et al. | .......... | 280/124.165 |
| 5,988,672 A * | 11/1999 | VanDenberg | ............... | 280/683 |
| 6,135,470 A * | 10/2000 | Dudding | ............... | 280/124.128 |
| 6,158,750 A * | 12/2000 | Gideon et al. | .............. | 280/86.5 |
| 6,328,322 B1 * | 12/2001 | Pierce | .................. | 280/124.131 |
| 6,527,286 B2 | 3/2003 | Keeler et al. | | |
| 6,607,205 B2 * | 8/2003 | Platner | ................. | 280/124.116 |
| 6,622,996 B2 * | 9/2003 | Mayerbock et al. | ....... | 267/141.3 |
| 6,808,192 B1 * | 10/2004 | Bol | ...................... | 280/124.116 |
| 6,834,873 B1 * | 12/2004 | Vander Kooi et al. | . | 280/124.107 |
| 6,851,689 B2 * | 2/2005 | Dudding et al. | ........ | 280/124.128 |
| 6,871,864 B2 * | 3/2005 | Reineck | ............... | 280/124.107 |
| 6,886,840 B2 * | 5/2005 | Reineck | ............... | 280/124.107 |
| 6,945,548 B2 * | 9/2005 | Dudding et al. | ........ | 280/124.157 |
| 7,182,354 B2 * | 2/2007 | Dudding | ................ | 280/124.11 |
| 2003/0057622 A1 * | 3/2003 | Bovio et al. | .................. | 267/281 |
| 2003/0214118 A1 * | 11/2003 | Pavuk | ........................ | 280/678 |
| 2004/0007844 A1 * | 1/2004 | Reineck | ............... | 280/124.107 |
| 2004/0056446 A1 * | 3/2004 | Dudding et al. | ........ | 280/124.128 |

(Continued)

*Primary Examiner*—Paul N Dickson
*Assistant Examiner*—Joseph Rocca
(74) *Attorney, Agent, or Firm*—Dennis L. Thomte; Thomte Patent Law Office LLC

(57) ABSTRACT

A linkage-type air suspension system for supporting either a front steer axle or a rear drive axle includes a lower structure assembly which combines the lower control rods, a transverse rod and a stabilizer control system which functions as a single structure. The transverse control system includes a pair of lower beams which have one end thereof pivotally connected to mounting brackets secured to the frame members of the vehicle by pivot bearings. The other ends of the lower beams are pivotally connected to axle and wheel supports. A transverse control is secured to and extends between the lower beams.

5 Claims, 13 Drawing Sheets

U.S. PATENT DOCUMENTS

2004/0188973 A1* 9/2004 Molitor ............... 280/124.166
2005/0146110 A1* 7/2005 Dudding .............. 280/124.128
2005/0161896 A1* 7/2005 Reineck ............... 280/124.128
2006/0001311 A1* 1/2006 Platner et al. ............ 301/124.1

* cited by examiner

LINKAGE-TYPE AIR SUSPENSION SYSTEM

BACKGROUND OF THE INVENTION

1. Field of the Invention

This invention relates to a linkage-type air suspension system for a vehicle such as a truck or the like. More particularly, the suspension system of this invention relates to a transverse control system which is incorporated into the lower control rods of the linkage-type suspension system and which eliminates the packaging problems associated with conventional transverse control systems. Even more particularly, the invention relates to a linkage-type air suspension system which may be used in association with a front steer axle or a rear drive axle and may be of the leading type or trailing type. Even more particularly, the invention utilizes specially designed pivot bushings which may be used: (1) at the rear of the transverse control system; (2) at the front of the transverse control system; or (3) at both the front and rear pivots of the transverse control system.

2. Description of the Related Art

Linkage-type air suspension systems generally have separate control systems which make up the total suspension system. The separate control systems normally include upper and lower control rods to control the suspension movements of the front steer axle or the rear drive axle and which also absorb the forces encountered from braking, accelerating, impact, etc. Conventional linkage-type air suspension systems utilize a transverse rod control system to absorb the side loads and often utilize a stabilizer system to control the vehicle's sway. All of these systems require packaging space and numerous parts.

With respect to the front steer axle suspension systems of the prior art, the packaging of a transverse rod is often not possible due to interferences with the engine oil pan sump and/or other related engine systems occupying the area around the front axle I-beam. A conventional stabilizer system can be packaged with minimal issues but such a system will add several components and linkages adding parts, weight and additional service points.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A linkage-type air suspension system for a truck or the like is disclosed which may be used on either the front steer axle of the truck or on the rear drive axle of the truck and may be of the leading type or trailing type. The suspension system of this invention will be described as being associated with a front steer axle and being of the leading type but it should be understood that the suspension system could be a trailing type and associated with a rear drive axle. Normally, the front steer axle is secured to first and second longitudinally extending frame members which have rearward and forward ends. First and second mounting brackets are secured to the first and second frame members respectively. A first conventional upper control arm having forward and rearward ends, is pivotally secured at its rearward end to the first mounting bracket and extends forwardly therefrom. A second conventional upper control arm, having forward and rearward ends, is pivotally secured at its rearward end to the second mounting bracket and extends forwardly therefrom.

First and second axle supports are positioned forwardly of the first and second mounting brackets, respectively. The forward end of the first upper control arm is pivotally secured to the first axle support and the forward end of the second upper control arm is pivotally secured to the second axle support. An axle and wheel assembly is operatively secured to the first and second axle supports and extends therebetween.

The system of this invention also includes first and second air springs having upper and lower ends. The upper ends of the first and second air springs are secured to the first and second frame members forwardly of the first and second mounting brackets respectively. The lower ends of the first and second air springs are operatively secured to the first and second axle supports respectively.

The system of this invention also includes a first lower control beam having forward and rearward ends and a second lower control beam having forward and rearward ends. The first lower control beam is pivotally secured at its rearward end to the first mounting bracket and extends forwardly therefrom. The second lower control beam is pivotally secured at its rearward end to the second mounting bracket and extends rearwardly therefrom. The forward ends of the first and second lower control beams are pivotally secured to the first and second axle supports, respectively. A transverse control means is secured to and extends between the first and second lower control beams.

In the preferred embodiment, each of the lower control beams are elongated box-like tubular members, each of which have a top wall, opposite side walls and a bottom wall, so as to have a generally rectangular cross-section configuration. A transverse control means is secured to and extends between the lower control beams. In the preferred embodiment, the transverse control means comprises a flat plate which has a forward end, a rearward end, and opposite side edges. The opposite side edges of the flat plate are secured to the bottom walls of the lower control beams and extends therebetween. If the system of this invention is used with a front steer axle, the forward end of the flat plate has arcuate cut-out portion formed therein to accommodate the oil pan sump of the truck engine.

The forward ends of the lower control beams are pivotally secured to the first and second axle supports by means of rubber bushings. Each of the rearward ends of the lower control beams are pivotally connected to the mounting brackets by means of a special pivot bushing assembly which permits vertical movement of the lower control beams while restricting horizontal or transverse movement of the lower control beams. The special pivot assembly may be used at the rearward or forward ends of the lower control beams or at both the rearward and forward ends of the lower control beams.

It is therefore a principal object of the invention to provide an improved linkage-type air suspension system for either a front steer axle or a rear drive axle of a vehicle and which may be of the leading type or trailing type.

A further object of the invention is to provide a system of the type described which incorporates a transverse control system within the lower control rods of the linkage-type suspension system which eliminates the packaging problems of the transverse control systems of the prior art.

Still another object of the invention is to provide a linkage-type air suspension system for a truck or the like which reduces the number of required suspension parts.

Still another object of the invention is to provide a linkage-type air suspension system for a vehicle wherein a lower control structure assembly combines the function of lower control rods, a transverse rod and a stabilizer control system.

Still another object of the invention is to provide a unique pivot bushing which pivotally secures the lower control beams to the mounting brackets in such a way that permits vertical movement of the ends of the lower control beams while limiting or restricting horizontal movement thereof.

Still another object of the invention is to provide a system of the type described which includes a unique transverse control system which is incorporated into the lower control beams to absorb the side loads, control the vehicle sway, all with a reduced number of packaging parts.

Yet another object of the invention is to provide specially designed pivot bushings which may be utilized at the rearward or forward ends of the lower control beams or utilized at both the rearward and forward ends of the lower control beams.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
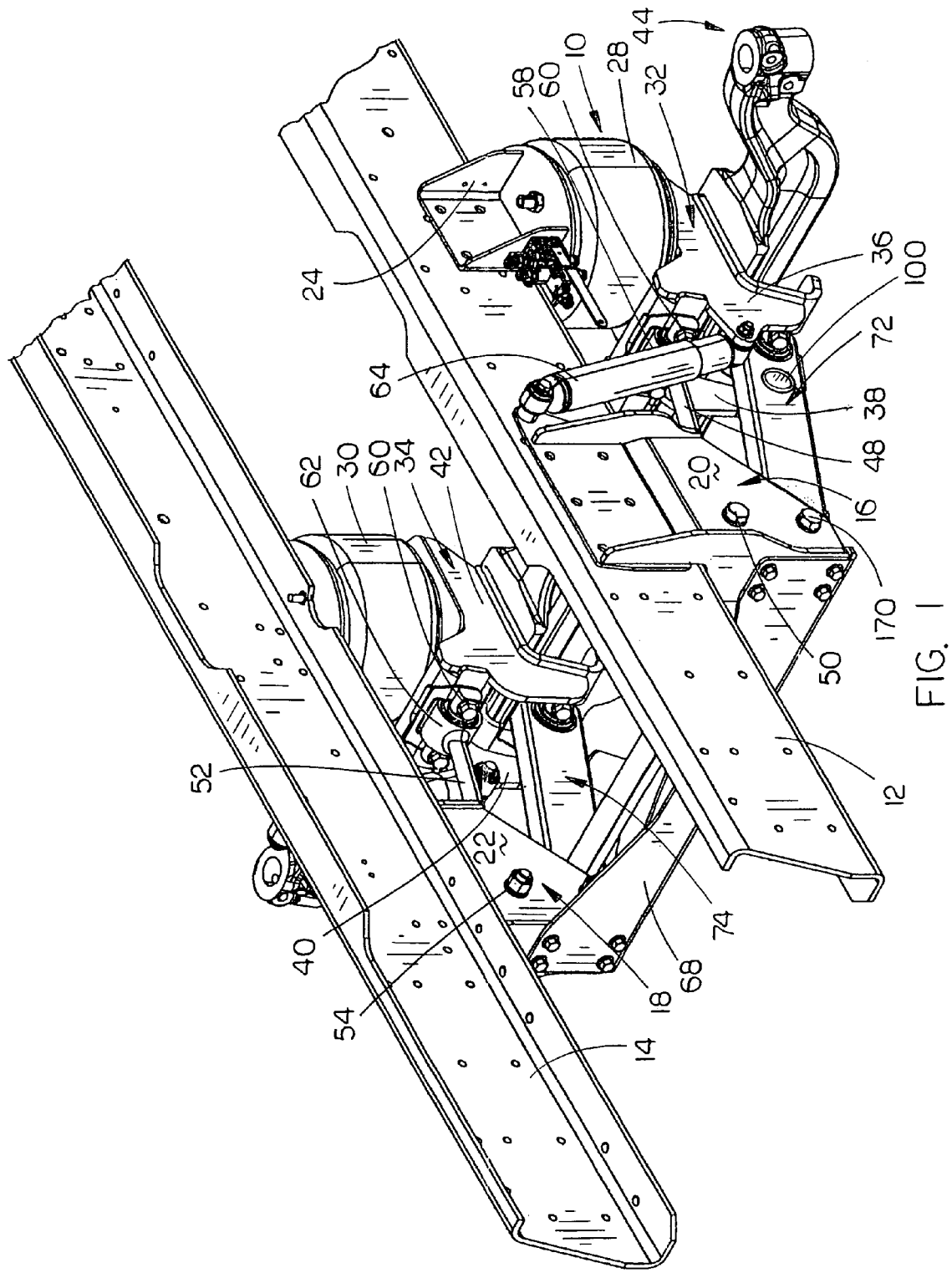
FIG. 1 is a partial rear perspective view of the suspension system of this invention mounted on the frame members of a truck with portions thereof removed to more fully illustrate the invention and which illustrates a front steer axle.
Figure 2:
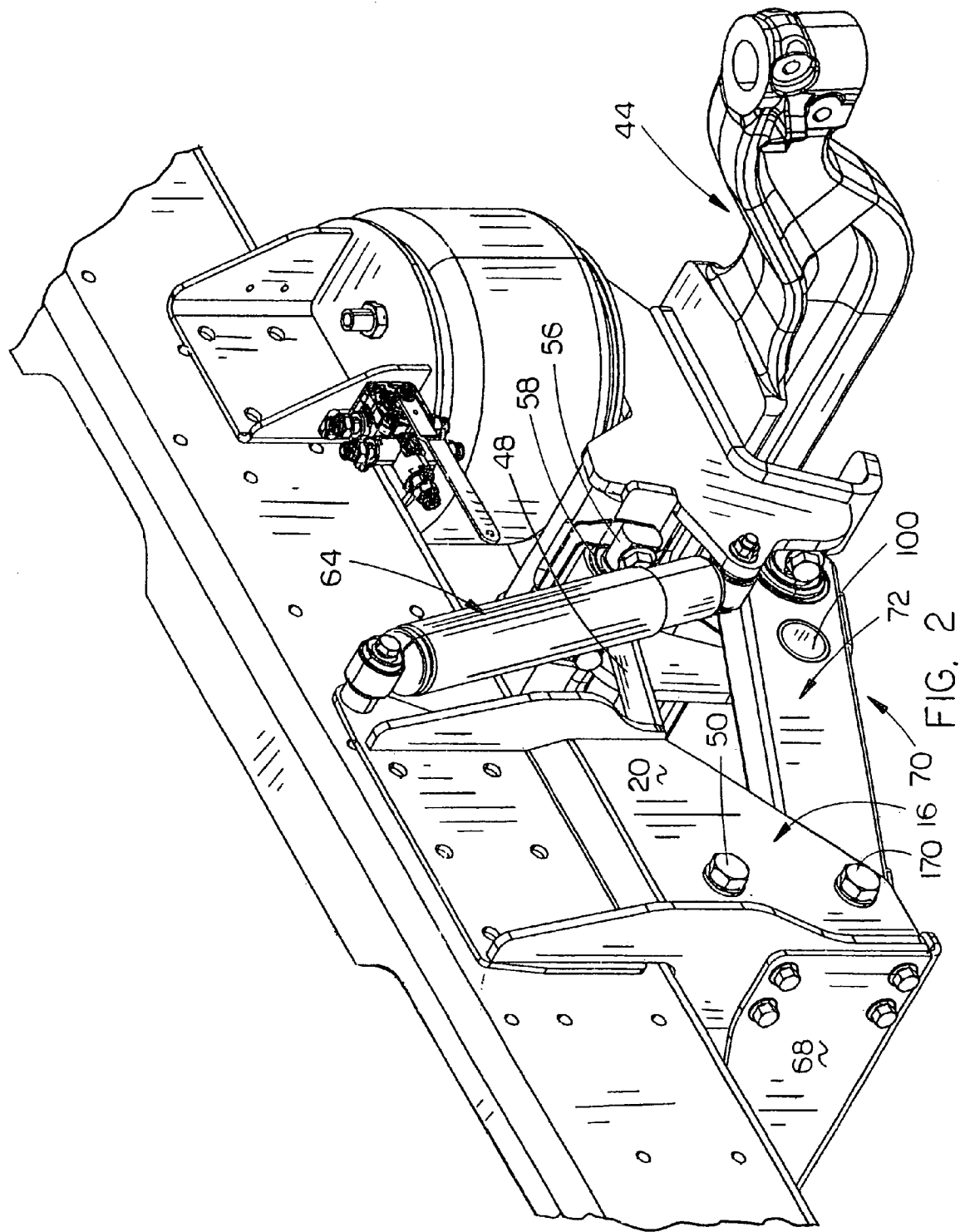
FIG. 2 is a partial rear perspective view of the left portion of the system of FIG. 1.
Figure 3:
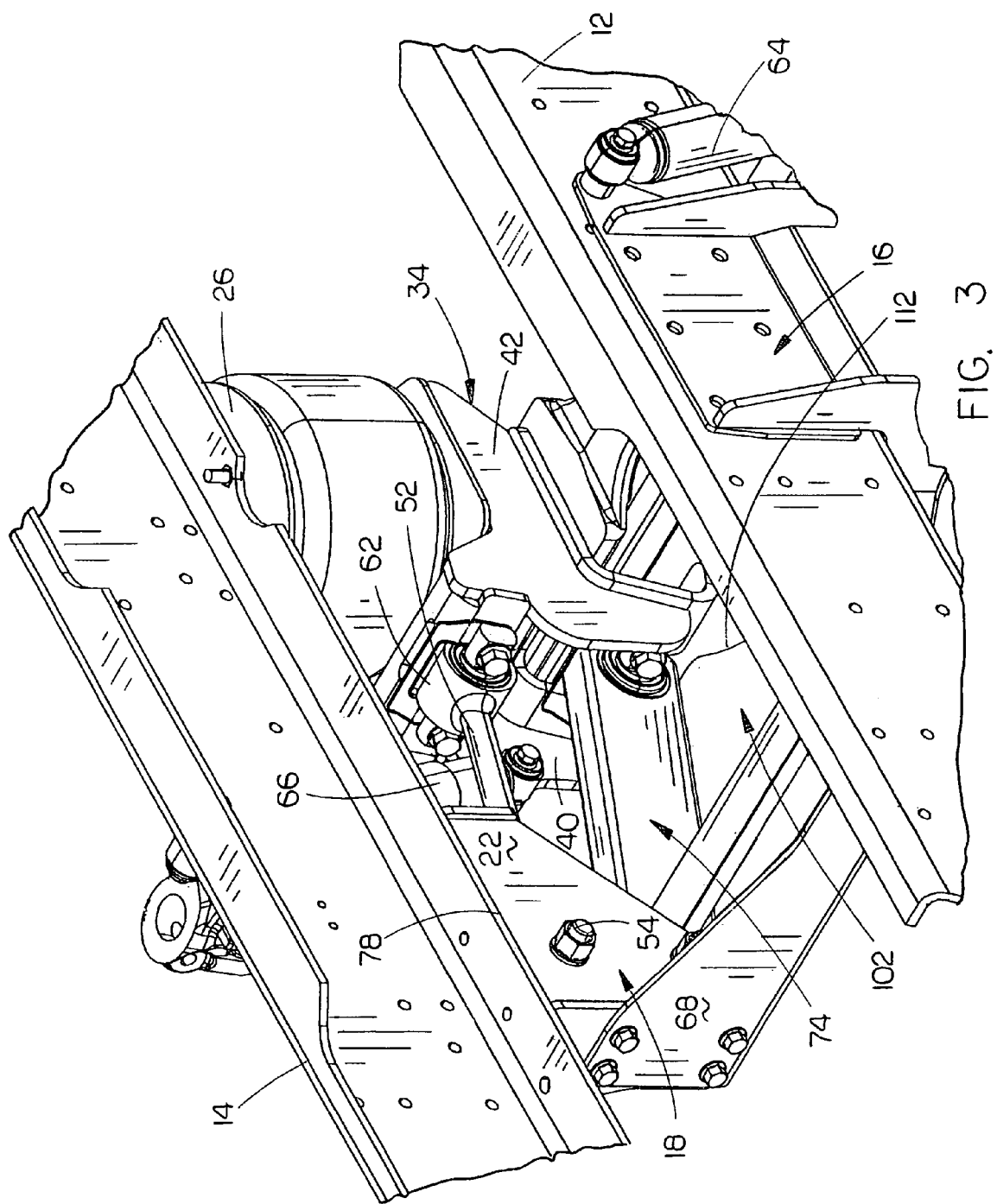
FIG. 3 is a view similar to FIG. 2 except that the left portion of the suspension system of this invention is illustrated.
Figure 4:
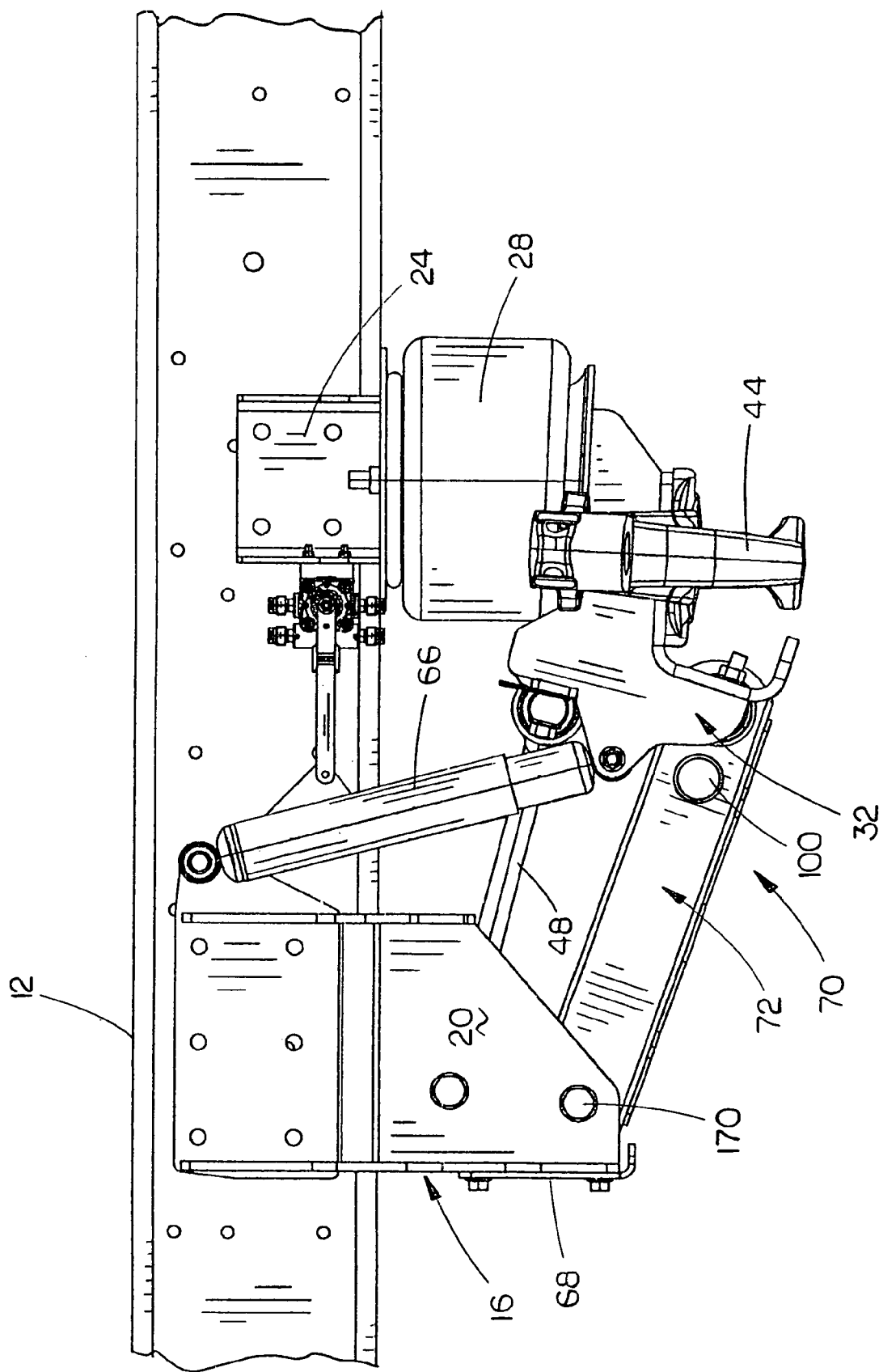
FIG. 4 is a side view of the system of FIG. 1 from the right side of the vehicle.
Figure 5:
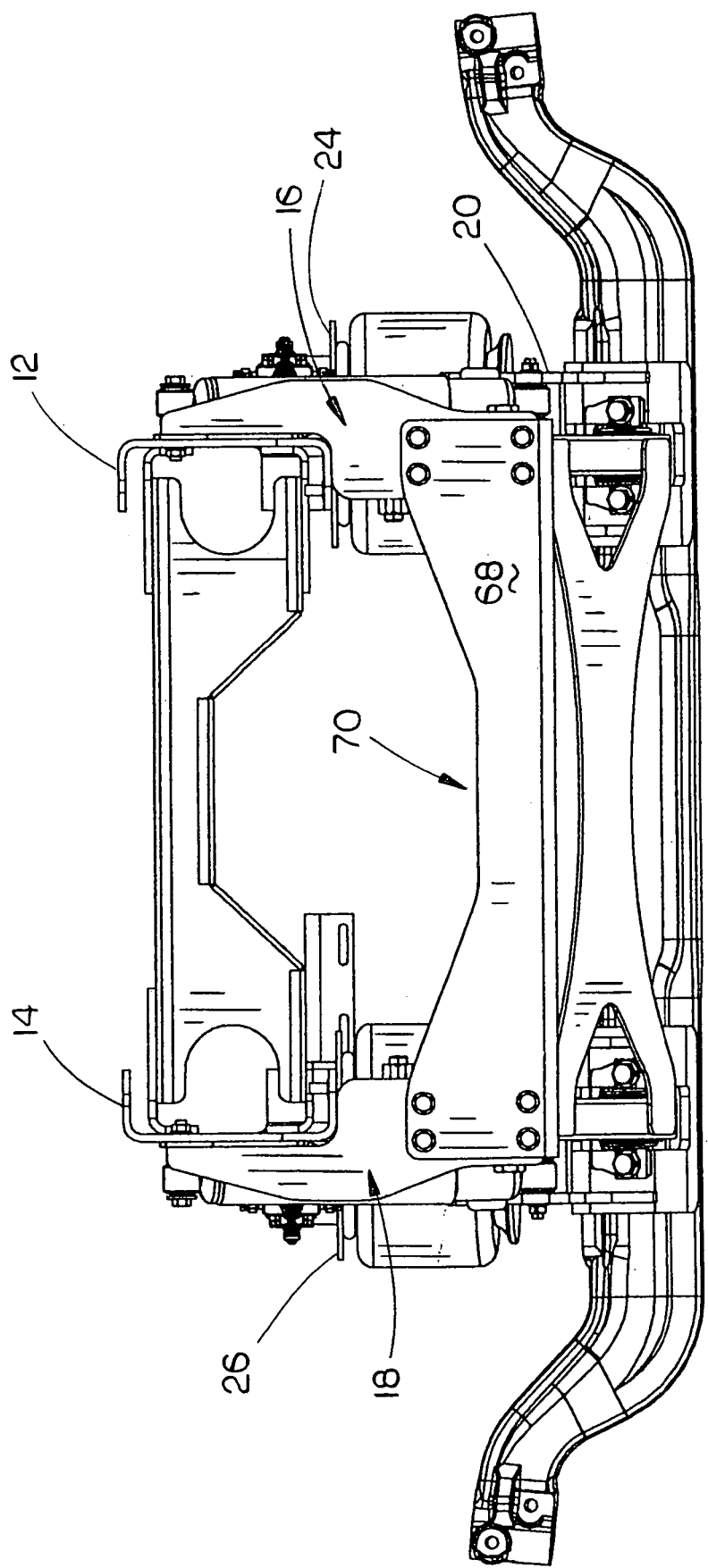
FIG. 5 is a rear view of the suspension of FIG. 1 associated with a front steer axle.
Figure 6:
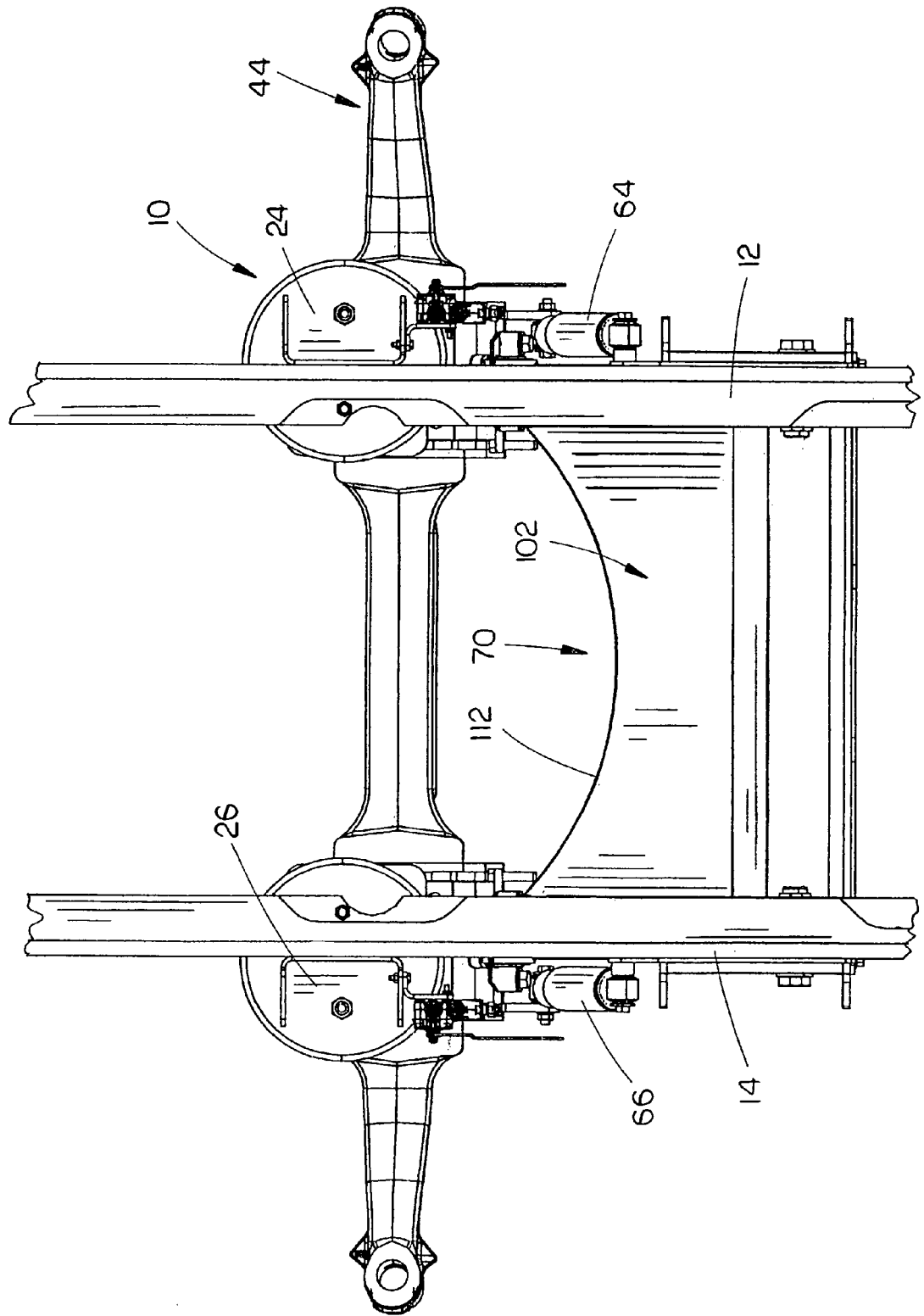
FIG. 6 is a top view illustrating the suspension system of FIG. 1 in association with a front steer axle.
Figure 7:
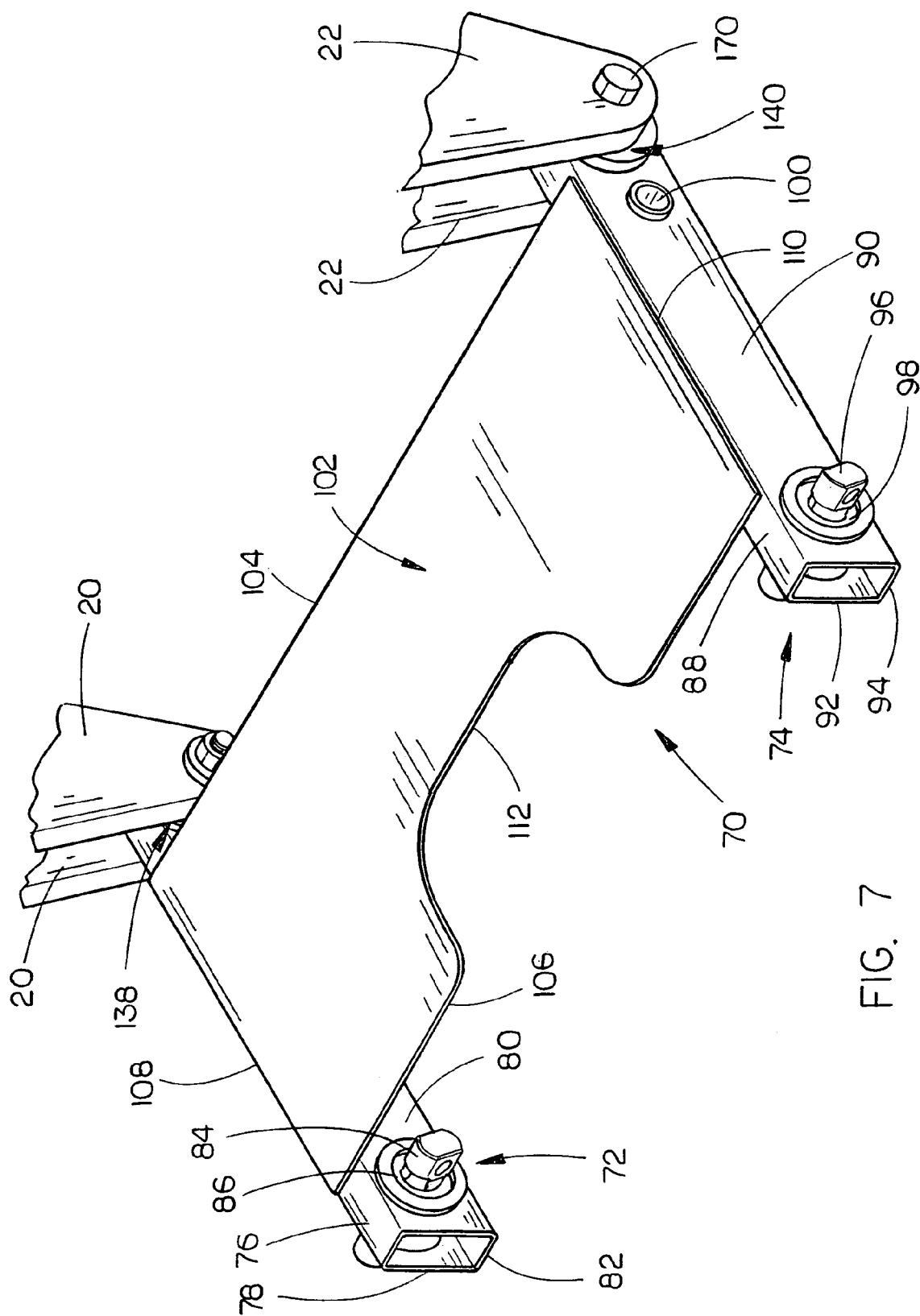
FIG. 7 is a bottom front perspective view of the lower control structure and transverse control structure of FIG. 1.
Figure 8:
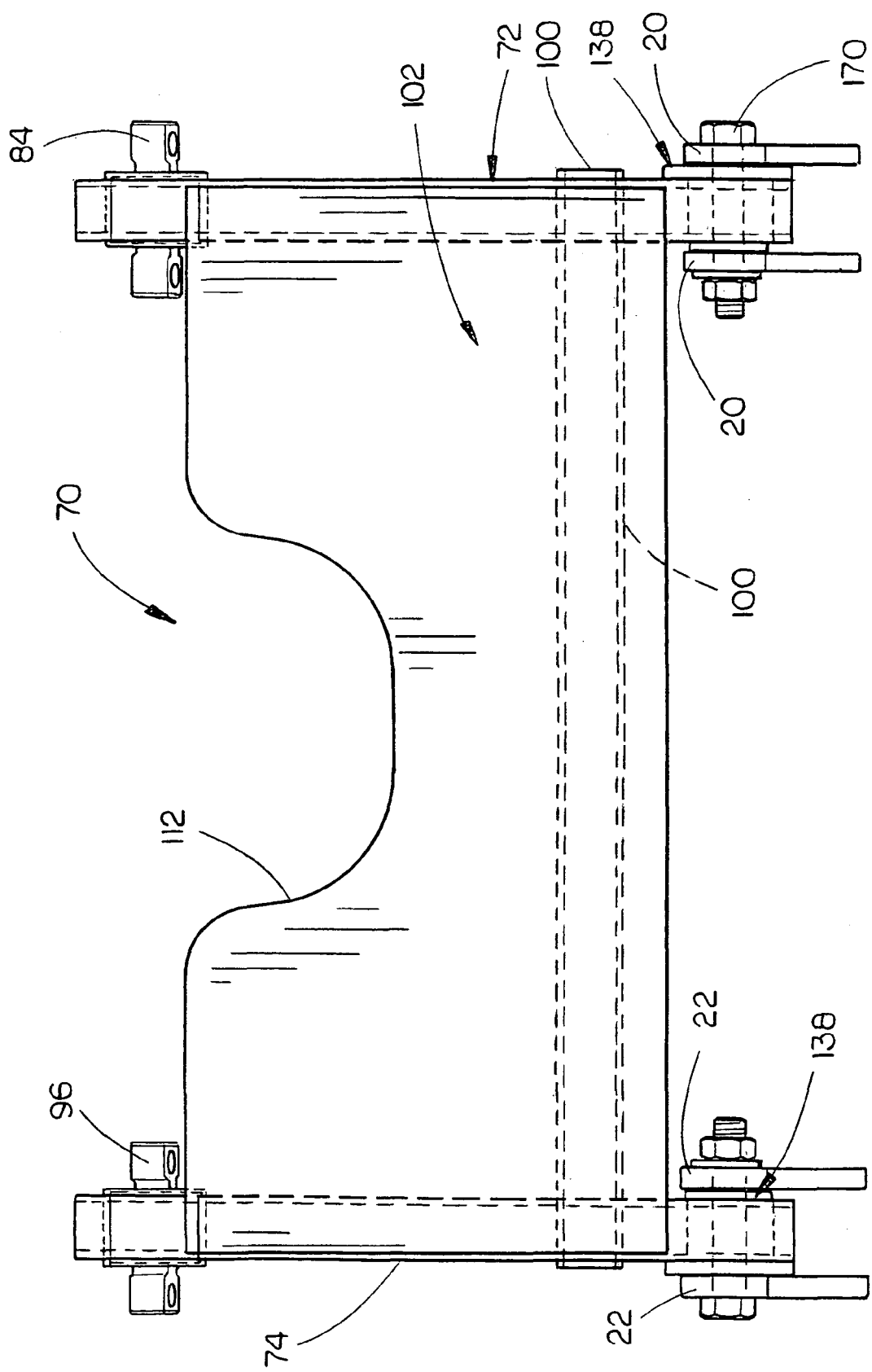
FIG. 8 is a bottom view of the structure of FIG. 7.
Figure 9:
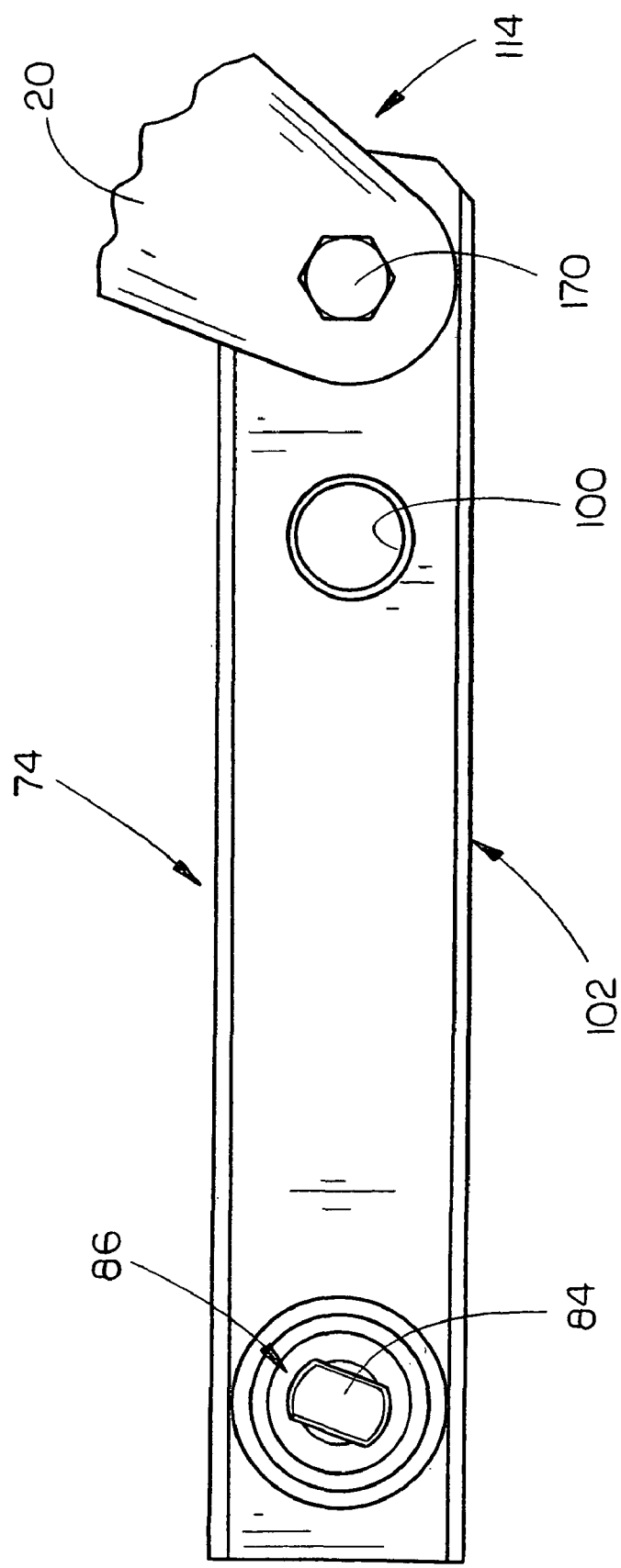
FIG. 9 is a side view of the structure of FIG. 8 in its normal operative position, as seen from the left side thereof.
Figure 10:
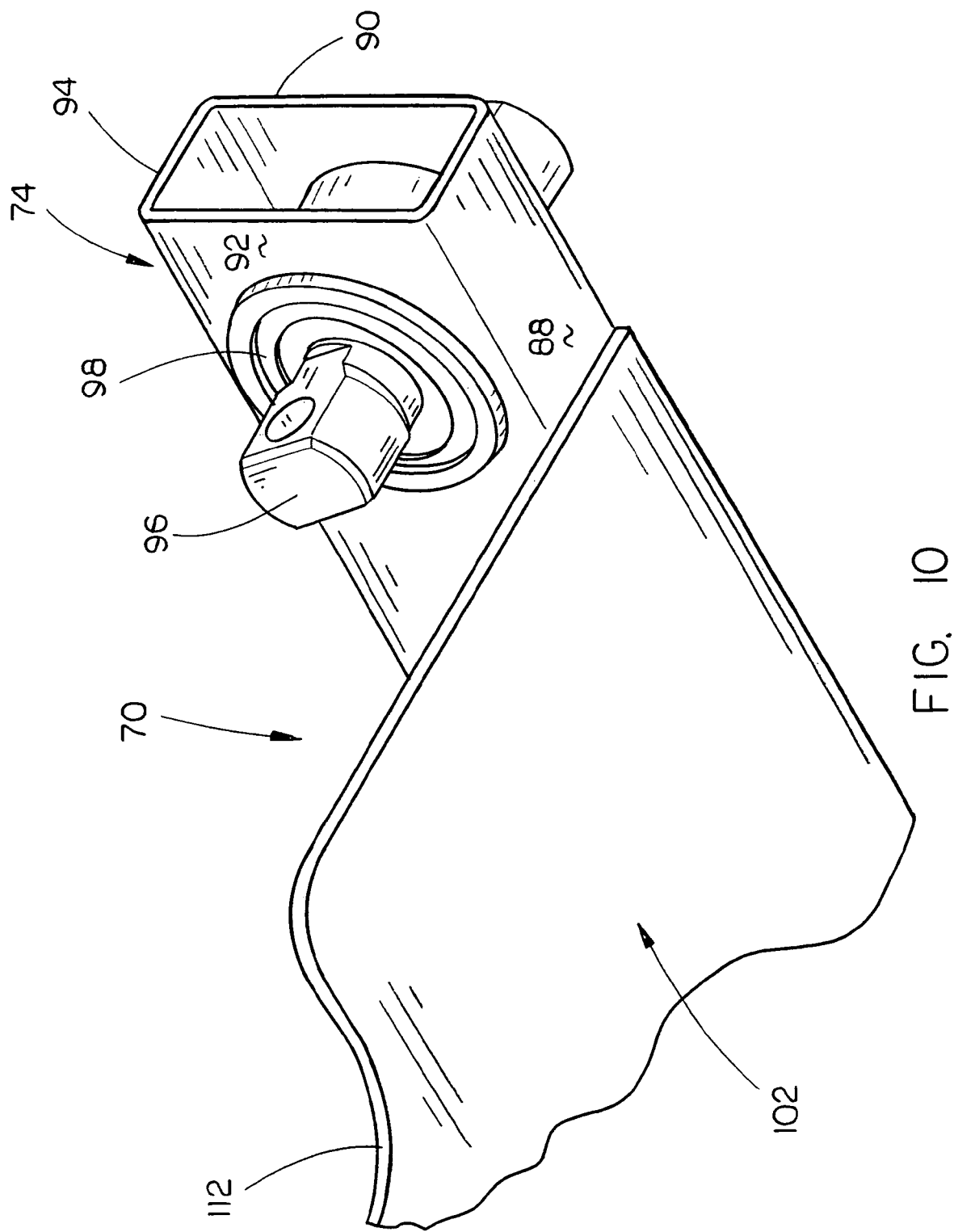
FIG. 10 is a partial bottom front perspective view of a portion of the structure of FIG. 8.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The linkage-type air suspension system of this invention is referred to generally by the reference numeral 10 while the reference numerals 12 and 14 refer to longitudinally extending frame members 12 and 14 of a vehicle such as a truck or the like. The suspension system 10 will be described as being associated with a front steer axle and being of the leading type although the suspension system of the invention may be of the trailing type and may be associated with a rear drive axle. In other words, if the suspension system 10 is associated with a front steer axle, it may be of the leading or trailing type. If the suspension system 10 is associated with a rear drive axle, it may also be of the leading or trailing type.

The numeral 16 refers to a first mounting bracket which is secured to frame member 12 while the numeral 18, refers to a second mounting bracket which is secured to frame member 14. As seen in the drawings, the mounting brackets 16 and 18 extend downwardly from the frame members 12 and 14 respectively. Mounting bracket 16 includes a pair of horizontally spaced-apart flanges 20. Mounting bracket 18 includes a pair of horizontally spaced-apart flanges 22.

Air spring mounting brackets 24 and 26 are secured to frame members 12 and 14 and extend downwardly therefrom forwardly of mounting brackets 24 and 26 and have the upper ends of air springs 28 and 30 secured thereto respectively in conventional fashion. The lower ends of air springs 28 and 30 are connected to axle and wheel supports 32 and 34 respectively. Axle and wheel support 32 includes a pair of horizontally spaced-apart flanges 36 and 38 while axle and wheel support 34 includes a pair of horizontally spaced-apart flanges 40 and 42. Axle 44 is secured to the axle and wheel supports 32 and 34 in conventional fashion and extends therebetween. Although the drawings illustrate that the axle 44 is a front steer axle, a rear drive axle could also be utilized with the invention described herein as stated above.

The rearward end of an upper control rod 48 is received between the flanges 20 of bracket 16 and is pivotally secured thereto by means of a bolt 50 which extends through the flanges 20 and a bushing secured to the rearward end of the control rod 48. The rearward end of an upper control rod 52 is received between the spaced-apart flanges 22 of the mounting bracket 18 and is pivotally secured thereto by means of a bolt 54 which extends through the flanges 22 and a bushing secured to the rearward end of the control rod 52. The forward end of control rod 48 is pivotally secured to the axle and wheel support 32 by means of a bolt 56 extending through a bushing 58 which is operatively secured to the axle and wheel support 32. Similarly, the forward end of upper control rod 52 is pivotally secured to the axle and wheel support 34 by means of a bolt 60 extending through a bushing 62 secured to the forward end of the control rod 52 which is operatively secured to the axle and wheel support 34. The upper control rods 48 and 52 are conventional in design and function in conventional fashion.

Shock absorber 64 is operatively pivotally secured at its upper end to the mounting bracket 20 and is pivotally secured at its lower end to the axle and wheel support 32. Similarly, a shock absorber 66 is operatively pivotally secured at its upper end to mounting bracket 18 and is pivotally secured at its lower end to the axle and wheel support 34. A support plate 68 is secured at its opposite ends to the rearward ends of mounting brackets 16 and 18 and extends therebetween to add rigidity and strength to the mounting brackets 16 and 18.

The numeral 70 refers to a lower structure assembly which combines the function of a pair of lower rods, a transverse rod and a stabilizer control system. Assembly 70 includes a first lower control beam 72 and a second lower control beam 74 with the beams 72 and 74 being identical. Beam 72 is comprised of a top wall 76, an outer side wall 78, an inner side wall 80 and a bottom wall 82. In cross section, beam 72 is generally rectangular and is comprised of a steel material. The forward end of beam 72 is pivotally secured to support 32 by means of a bolt 84 extending through bushing 86 mounted in the forward end of beam 72 with the bolt 84 also extending through the flanges 36 and 38 of support 32.

Lower control beam 74 includes a top wall 88, an outer side wall 90, an inner side wall 92 and a bottom wall 94. The forward end of lower control beam 74 is pivotally secured to the flanges 36 and 38 of support 34 by means of bolt 96 extending through a bushing 98 mounted in the forward end of beam 74 and through the flanges 40 and 42 of support 34. A tube or rod 100 has its opposite ends secured to and extending between the beams 72 and 74 at the rearward ends thereof by welding or the like as seen in the drawings. The ends of the rod or tube 100 extend through the inner and outer side walls of the beams 72 and 74 and are welded thereto.

The numeral 102 refers to a transverse control means which is shown as a flat plate having a rearward end 104, forward end 106 and side edges 108 and 110. The transverse control means 102 may take different forms as long as it extends between the control beams 72 and 74. If desired, control beams 72, 74 and control means 102 could be of one-piece construction. The side edges 108 and 110 of plate 102 are positioned beneath the bottom walls 82 and 94 of beams 72 and 74 respectively and are welded thereto. The forward end 106 of plate 102 is provided with an arcuate cut-away or recessed portion 112 to accommodate the oil pan sump of the truck engine, if the suspension system is used on a front steer axle.

The rearward ends of beams 72 and 74 are pivotally connected to the mounting brackets 16 and 18 respectively by identical pivot bushing assemblies 138 and 140. Inasmuch as the pivot bushing assemblies 138 and 140 are identical, only pivot bushing assembly 138 will be described in detail.

Figure 11:
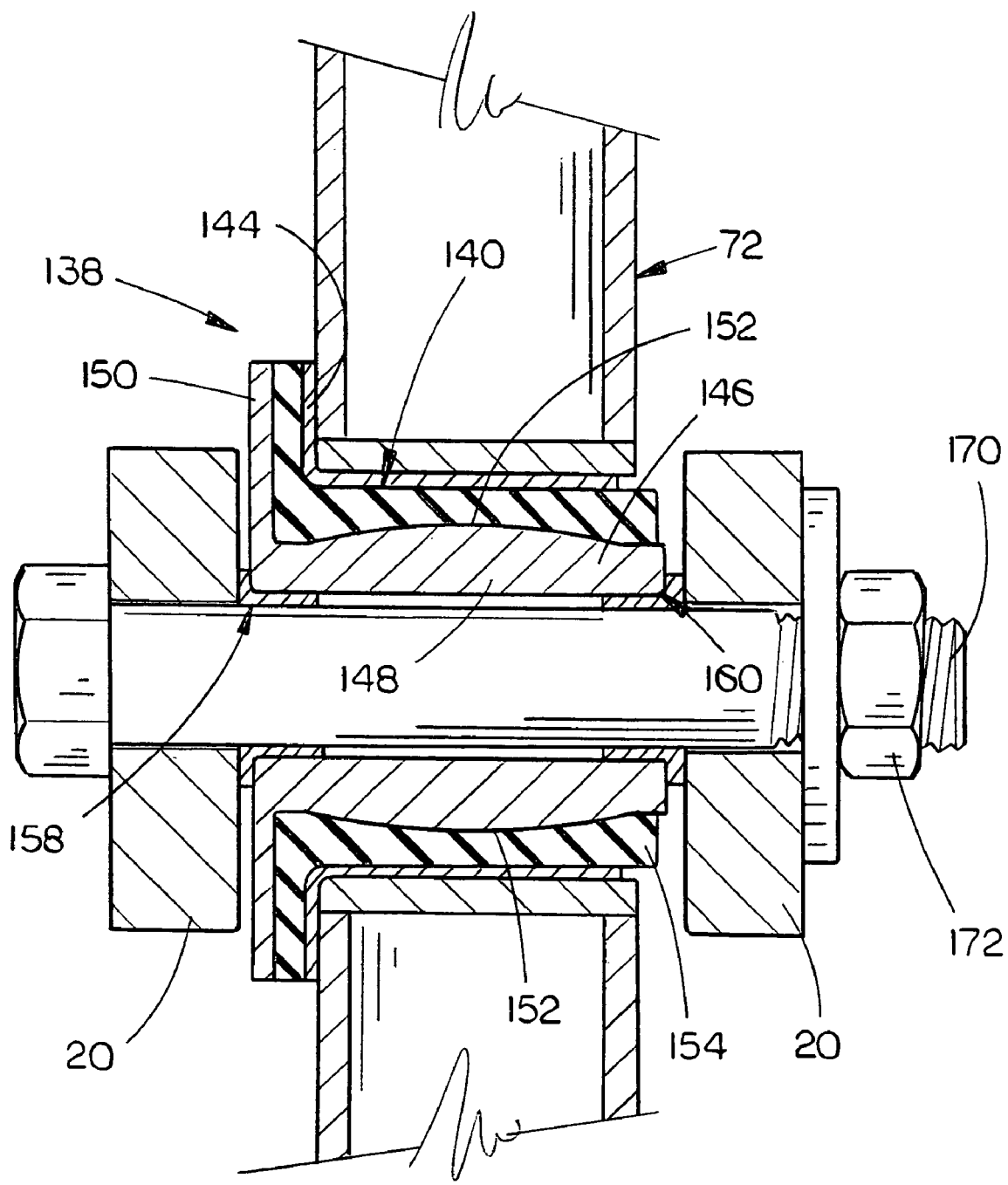
FIG. 11 is a sectional view of one of the rear pivot bushing assemblies.
Figure 12:
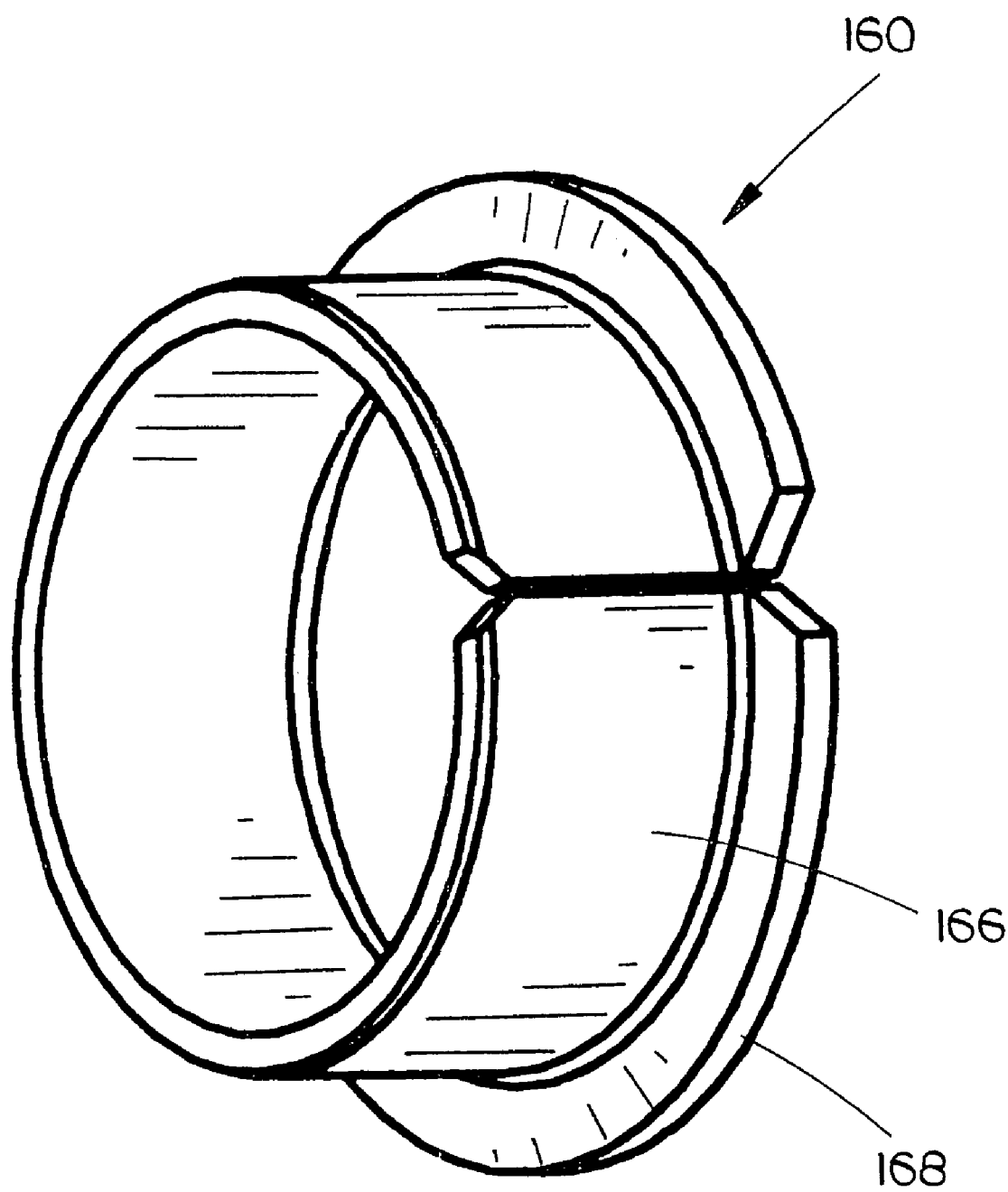
FIG. 12 is a perspective view of one of the flange bearings of the pivot bushing assembly of FIG. 11.
Figure 13:
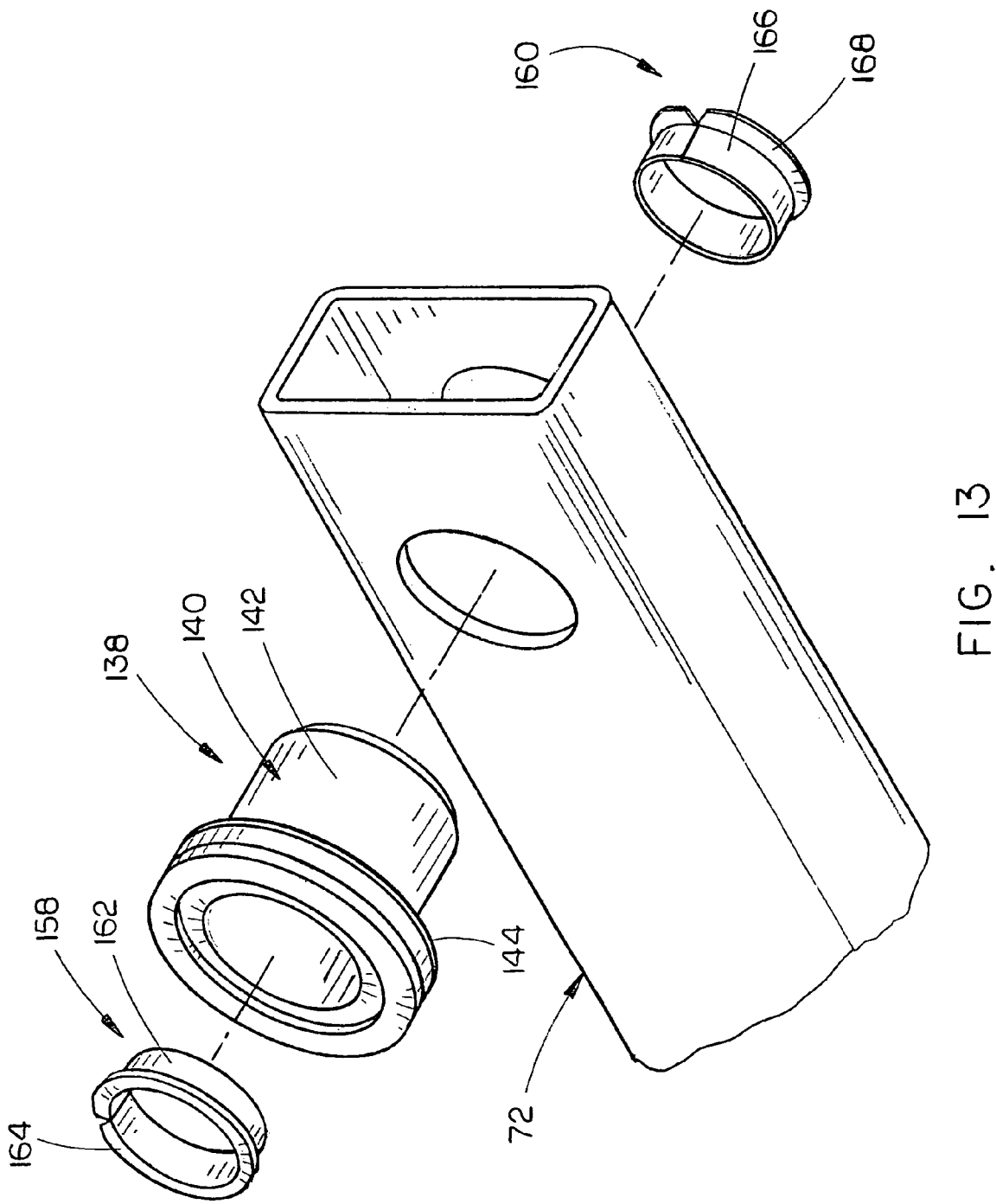
FIG. 13 is a partial rear perspective view of the pivot bushing assembly of FIG. 11.

As seen in FIGS. 11 and 13, pivot bushing assembly 138 includes an outer steel tube 140 including a cylindrical body portion 142 and a flange 144 extending from one end of the body portion 142. Assembly 138 also includes an inner steel tube 146 which includes a cylindrical body portion 148 and a flange 150 extending therefrom at one end thereof. Body portion 148 has a bulging or bulge portion 152 with the greatest height thereof being in the center of the body portion 148. The numeral 154 refers to an elastomeric or rubber bushing which is positioned between the outer steel tube 140 and the inner steel tube 46 as illustrated in FIG. 11. As seen in FIG. 11, the bulge 152 protrudes into the bushing 154.

The numerals 158 and 160 refer to identical flange bearings. Preferably, each of the bearings is comprised of a low friction plastic material such as Norglide® which is coated or plated with zinc. Flange bearing 158 includes a body portion 162 and a flange 164 extending therefrom. Similarly, flange bearing 160 includes a body portion 166 and a flange 168 extending therefrom. The flange bearings 158 and 160 are pressed into the opposite ends of the sleeve 156 so that the flanges thereof are positioned outwardly of the inner steel tube 146 as seen in FIG. 11 to provide a rotating surface on both sides of the bearing and which will absorb lateral thrust loads. Shoulder bolt 170 extends through flange 118, flange bearing 158, flange bearing 160, and through flange 120. The inner end of shoulder bolt 170 has a nut 172 or the like threadably mounted thereon. Shoulder bolt 170 is provided to control the gap (clearances) of the pivot assembly.

As can be appreciated above, the incorporation of the transverse control system within the lower control rods of the linkage-type suspension system eliminates the packaging problems of the prior art transverse control system and the combined system of this invention reduces the required number of suspension parts since several parts are eliminated such as the transverse rod and brackets. The front pivots 86 and 98 include rubber bushings which allows the lower structure 70 to move within the joints. Although the front pivots 86 and 98 are shown to be the straddle pin type, they could be typical rubber bushings with steel inner and outer tubes and clamp by a cross bolt and nut to the front bracket. The straddle pin shown in the drawings can provide for suspension adjustment by adding or removing shims either for side-to-side control arm adjustment or caster angle.

The two rear pivot bushing assemblies 138 and 140 allow the lower structure assembly to move vertically at a specific deflection rate, while limiting the horizontal movement. The horizontal movement is limited by the bulge 152 on the inner sleeve thereby providing the bushing with different deflection rates depending on the "bulge" position. The bulge 152 is mounted in a horizontal position to restrict the horizontal travel and will also result in a high deflection rate with minimal or no movement. The desired deflection rate in the vertical direction of the pivot bushing assembly 138 is 3000 lbs./inch to allow for the stabilizer effect. The vertical rate in each of the bushing assemblies 138 and 140 will allow vertical travel in opposite sides of the pivots and in combination with the deflection within the lower structure providing for the stabilizer effect of the suspension. The two low friction flange bearings 158 and 160 provide for the free rotation of the lower structure assembly 70. The pivot bushings 138 and 140 may also be used at the forward ends of the lower structure assembly or at both the forward and rearward ends of the lower structure assembly.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An axle suspension system for a vehicle including first and second longitudinally extending frame members having first and second ends, comprising:

first and second mounting brackets secured to said first and second frame members, respectively;

a first upper control arm, having first and second ends, pivotally secured at its said first end to said first mounting bracket and extending longitudinally therefrom;

a second upper control arm, having first and second ends, pivotally secured at its said first end to said second mounting bracket and extending longitudinally therefrom;

first and second axle and wheel supports positioned longitudinally of said first and second mounting brackets, respectively;

said second end of said first upper control arm being pivotally secured to said first axle and wheel support;

said second end of said second upper control arm being pivotally secured to said second axle and wheel support;

first and second air springs having upper and lower ends;

said upper ends of said first and second air springs being secured to said first and second frame members longitudinally of said first and second mounting brackets, respectively;

said lower ends of said first and second air springs being operatively secured to said first and second axle and wheel supports, respectively;
a first lower control beam having first and second ends;
a second lower control beam having first and second ends;
said first lower control beam being pivotally secured at its said first end to said first mounting bracket and extending longitudinally therefrom;
said second lower control beam being pivotally secured at its said first end to said second mounting bracket and extending longitudinally therefrom;
said second ends of said first and second lower control beams being pivotally secured to said first and second axle and wheel supports, respectively;
and a transverse control means secured to and extending between said first and second lower control beams;
said first and second lower control beams comprising tubular members;
each of said tubular members comprising a top wall having inner and outer sides, an outer side wall, having upper and lower ends, extending downwardly from said outer side of said top wall, an inner side wall, having upper and lower ends, extending downwardly from said inner side of said top wall, and a bottom wall, having inner and outer sides, extending between said lower ends of said inner and outer side walls;
each of said inner and outer side walls of each of said first and second lower control beams having a first circular opening formed therein at said first ends thereof;
each of said inner and outer side walls of each of said first and second lower control beams having a second circular opening formed therein at said second ends thereof;
a first pivot bushing positioned in said first circular openings in said first lower control beam;
a second pivot bushing positioned in said first circular openings in said second lower control beam;
a third pivot bushing positioned in said second circular openings in said first lower control beam;
a fourth pivot bushing positioned in said second circular openings in said second lower control beam;
a first bolt extending through each of said first and second pivot bushings to pivotally secure said first ends of said first and second lower control beams to said first and second mounting brackets respectively;
a second bolt extending through each of said third and fourth pivot bushings to pivotally secure said second ends of said first and second lower control beams to said first and second axle and wheel supports respectively;
each of said third and fourth pivot bushings comprising:
(a) a metal outer tube including a cylindrical hollow body portion having a first end, a second end, a flange extending from said second end of said body portion, and inner and outer surfaces;
(b) a metal inner tube spaced from said outer tube and including a hollow tubular body portion having a first end, a second end, a flange extending from said second end of said body portion, and inner and outer surfaces;
(c) said body portion of said inner tube having a centrally disposed bulge portion formed in its outer surface which extends towards said body portion of said outer tube;
(d) a resilient bushing positioned between said outer and inner tubes;
(e) a first flange bearing including a hollow cylindrical body portion with inner and outer ends and a flange extending from said outer end thereof, said body portion of said first flange bearing being positioned within said hollow tubular body portion of said inner tube with said flange of said first flange bearing being positioned outboard of said first end of said first end of said inner tube;
(f) a second flange bearing including a hollow cylindrical body portion with inner and outer ends and a flange extending from said outer end thereof, said body portion of said second flange bearing being positioned within said hollow tubular body portion of said inner tube with said flange of said second flange bearing being positioned outboard of a portion of said flange of said inner tube;
(g) said second bolt extending through said second circular openings in said side walls of the associated lower control beam, said first and second flange bearings, said sleeve and through spaced-apart openings formed in the associated mounting bracket.

2. The axle suspension system of claim 1 wherein said bolt is a shoulder bolt.

3. The axle suspension system of claim 1 wherein said flange bearings are comprised of a low friction material.

4. An axle suspension system for a vehicle including first and second longitudinally extending frame members having first and second ends, comprising:
first and second mounting brackets secured to said first and second frame members, respectively;
a first upper control arm, having first and second ends, pivotally secured at its said first end to said first mounting bracket and extending longitudinally therefrom;
a second upper control arm, having first and second ends, pivotally secured at its said first end to said second mounting bracket and extending longitudinally therefrom;
first and second axle and wheel supports positioned longitudinally of said first and second mounting brackets, respectively;
said second end of said first upper control arm being pivotally secured to said first axle and wheel support;
said second end of said second upper control arm being pivotally secured to said second axle and wheel support;
first and second air springs having upper and lower ends;
said upper ends of said first and second air springs being secured to said first and second frame members longitudinally of said first and second mounting brackets, respectively;
said lower ends of said first and second air springs being operatively secured to said first and second axle and wheel supports, respectively;
a first lower control beam having first and second ends;
a second lower control beam having first and second ends;
said first lower control beam being pivotally secured at its said first end to said first mounting bracket and extending longitudinally therefrom;
said second lower control beam being pivotally secured at its said first end to said second mounting bracket and extending longitudinally therefrom;
said second ends of said first and second lower control beams being pivotally secured to said first and second axle and wheel supports, respectively;
each of said lower control beams having a pivot bushing mounted in said second end thereof which limits the horizontal transverse movement of the respective lower control beam relative to the longitudinally extending frame members;
each of said first and second lower control beams comprising tubular members;

each of said tubular members comprising a top wall having inner and outer sides, an outer side wall, having upper and lower ends, extending downwardly from said outer side of said top wall, an inner side wall, having upper and lower ends, extending downwardly from said inner side of said top wall, and a bottom wall, having inner and outer sides, extending between said lower ends of said inner and outer side walls;

each of said inner and outer side walls of each of said first and second lower control beams having a first circular opening formed therein at said forward ends thereof;

each of said inner and outer side walls of each of said first and second lower control beams having a second circular opening formed therein at said rearward ends thereof;

a first pivot bushing positioned in said first circular openings in said first lower control beam;

a second pivot bushing positioned in said first circular openings in said second lower control beam;

a third pivot bushing positioned in said second circular openings in said first lower control beam;

a fourth pivot bushing positioned in said second circular openings in said second lower control beam;

a first bolt extending through each of said first and second pivot bushings to pivotally secure said first ends of said first and second lower control beams to said first and second mounting brackets respectively;

a second bolt extending through each of said third and fourth pivot bushings to pivotally secure said first ends of said first and second lower control beams to said first and second mounting brackets respectively;

each of said first and second pivot bushings comprising:
(a) a metal outer tube including a cylindrical hollow body portion having a first end, a second end, a flange extending from said second end of said body portion, and inner and outer surfaces;
(b) a metal inner tube spaced from said outer tube and including a hollow tubular body portion having a first end, a second end, a flange extending from said second end of said body portion, and inner and outer surfaces;
(c) said body portion of said inner tube having a centrally disposed bulge portion formed in its outer surface which extends towards said body portion of said outer tube;
(d) a resilient bushing positioned between said outer and inner tubes;
(e) a first flange bearing including a hollow cylindrical body portion with inner and outer ends and a flange extending from said outer end thereof, said body portion of said first flange bearing being positioned within said hollow tubular body portion of said inner tube with said flange of said first flange bearing being positioned outboard of said first end of said first end of said inner tube;
(f) a second flange bearing including a hollow cylindrical body portion with inner and outer ends and a flange extending from said outer end thereof, said body portion of said second flange bearing being positioned within said hollow tubular body portion of said inner tube with said flange of said second flange bearing being positioned outboard of a portion of said flange of said inner tube;
(g) said first bolt extending through said first circular openings in said side walls of the associated lower control beam, said first and second flange bearings, said sleeve and through spaced-apart openings formed in the associated mounting bracket.

5. An axle suspension system for a vehicle including first and second longitudinally extending frame members having first and second ends, comprising:

first and second mounting brackets secured to said first and second frame members, respectively;

a first upper control arm, having first and second ends, pivotally secured at its said first end to said first mounting bracket and extending longitudinally therefrom;

a second upper control arm, having first and second ends, pivotally secured at its said first end to said second mounting bracket and extending longitudinally therefrom;

first and second axle and wheel supports positioned longitudinally of said first and second mounting brackets, respectively;

said second end of said first upper control arm being pivotally secured to said first axle and wheel support;

said second end of said second upper control arm being pivotally secured to said second axle and wheel support;

first and second air springs having upper and lower ends;

said upper ends of said first and second air springs being secured to said first and second frame members longitudinally of said first and second mounting brackets, respectively;

said lower ends of said first and second air springs being operatively secured to said first and second axle and wheel supports, respectively;

a first lower control beam having first and second ends;

a second lower control beam having first and second ends;

said first lower control beam being pivotally secured at its said first end to said first mounting bracket and extending longitudinally therefrom;

said second lower control beam being pivotally secured at its said first end to said second mounting bracket and extending longitudinally therefrom;

said second ends of said first and second lower control beams being pivotally secured to said first and second axle and wheel supports, respectively;

each of said lower control beams having a pivot bushing mounted in said second end thereof which limits the horizontal transverse movement of the respective lower control beam relative to the longitudinally extending frame members;

each of said first and second lower control beams comprising tubular members;

each of said tubular members comprising a top wall having inner and outer sides, an outer side wall, having upper and lower ends, extending downwardly from said outer side of said top wall, an inner side wall, having upper and lower ends, extending downwardly from said inner side of said top wall, and a bottom wall, having inner and outer sides, extending between said lower ends of said inner and outer side walls;

each of said inner and outer side walls of each of said first and second lower control beams having a first circular opening formed therein at said first ends thereof;

each of said inner and outer side walls of each of said first and second lower control beams having a second circular opening formed therein at said second ends thereof;

a first pivot bushing positioned in said first circular openings in said first lower control beam;

a second pivot bushing positioned in said first circular openings in said second lower control beam;

a third pivot bushing positioned in said second circular openings in said first lower control beam;

a fourth pivot bushing positioned in said second circular openings in said second lower control beam;

a first bolt extending through each of said first and second pivot bushings to pivotally secure said first ends of said first and second lower control beams to said first and second mounting brackets respectively;

a second bolt extending through each of said third and fourth pivot bushings to pivotally secure said first ends of said first and second lower control beams to said first and second mounting brackets respectively;

each of said third and fourth pivot bushing assemblies comprising:
- (a) a metal outer tube including a cylindrical hollow body portion having a first end, a second end, a flange extending from said second end of said body portion, and inner and outer surfaces;
- (b) a metal inner tube spaced from said outer tube and including a hollow tubular body portion having a first end, a second end, a flange extending from said second end of said body portion, and inner and outer surfaces;
- (c) said body portion of said inner tube having a centrally disposed bulge portion formed in its outer surface which extends towards said body portion of said outer tube;
- (d) a resilient bushing positioned between said outer and inner tubes;
- (e) a first flange bearing including a hollow cylindrical body portion with inner and outer ends and a flange extending from said outer end thereof, said body portion of said first flange bearing being positioned within said hollow tubular body portion of said inner tube with said flange of said first flange bearing being positioned outboard of said first end of said first end of said inner tube;
- (f) a second flange bearing including a hollow cylindrical body portion with inner and outer ends and a flange extending from said outer end thereof, said body portion of said second flange bearing being positioned within said hollow tubular body portion of said inner tube with said flange of said second flange bearing being positioned outboard of a portion of said flange of said inner tube;
- (g) said first bolt extending through said openings in said side walls of the associated lower control beam, said first and second flange bearings, said sleeve and through spaced-apart openings formed in the associated mounting bracket;

each of said first and second pivot bushings comprising:
- (a) a metal outer tube including a cylindrical hollow body portion having a first end, a second end, a flange extending from said second end of said body portion, and inner and outer surfaces;
- (b) a metal inner tube spaced from said outer tube and including a hollow tubular body portion having a first end, a second end, a flange extending from said second end of said body portion, and inner and outer surfaces;
- (c) said body portion of said inner tube having a centrally disposed bulge portion formed in its outer surface which extends towards said body portion of said outer tube;
- (d) a resilient bushing positioned between said outer and inner tubes;
- (e) a first flange bearing including a hollow cylindrical body portion with inner and outer ends and a flange extending from said outer end thereof, said body portion of said first flange bearing being positioned within said hollow tubular body portion of said inner tube with said flange of said first flange bearing being positioned outboard of said first end of said first end of said inner tube;
- (f) a second flange bearing including a hollow cylindrical body portion with inner and outer ends and a flange extending from said outer end thereof, said body portion of said second flange bearing being positioned within said hollow tubular body portion of said inner tube with said flange of said second flange bearing being positioned outboard of a portion of said flange of said inner tube;
- (g) said first bolt extending through said openings in said side walls of the associated lower control beam, said first and second flange bearings, said sleeve and through spaced-apart openings formed in the associated mounting bracket.

* * * * *